3,082,898
BLIND RIVETTING APPARATUS
Karl Bosch, Hermaringen, Germany, assignor to Adolf Diener Apparate und Maschinenbau, Hermaringen, Germany, a body corporate of Germany
Filed Oct. 7, 1959, Ser. No. 844,962
Claims priority, application Germany Oct. 9, 1958
6 Claims. (Cl. 218—47)

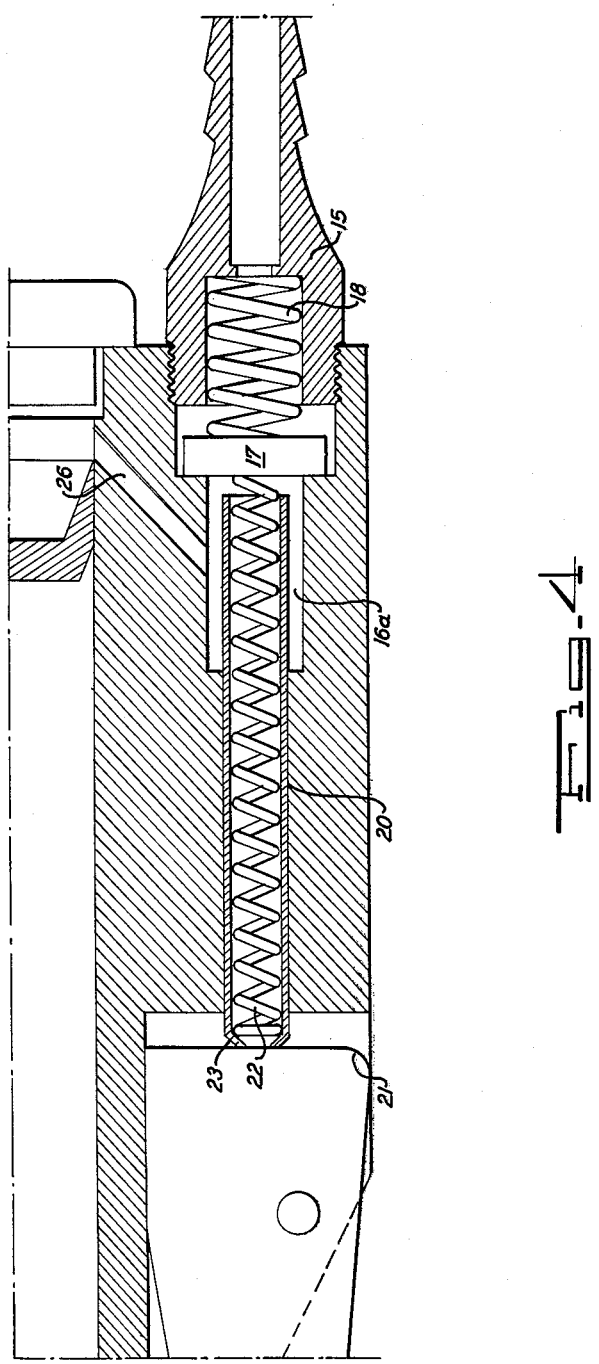

This invention relates to a blind rivetting appliance, in which a blind rivet is held in a chuck and is rivetted by external force. "Blind" rivets are rivets which make it possible to rivet parts such as, for example, two metal sheets together from one side without a tool being required for the other side, which may for instance be inaccessible or only accessible with difficulty. Blind rivets may consist essentially of a deformable hollow rivet body and a dowel thickened in the vicinity of the end lying opposite the head end of the hollow body, so that when said dowel is forcibly drawn through the hollow rivet body it deforms the body to form a "closer" head on the hidden tail of the hollow rivet body opposite the set head of the rivet. In the empty hollow rivet body there may be subsequently inserted from the rivetting side a special pin, or the withdrawable dowel may be so constructed that it tears through and breaks off at a predetermined spot under a given tensile stress, so that substantially as much of the dowel remains in the hollow rivet body as is required to fill the hollow rivet to the set head end. The broken off part of the dowel shank is thrown away.

The present invention relates in particular to blind rivetting appliances for use with blind rivets consisting of a hollow rivet body and a dowel, which is torn off at a predetermined fracture point in the manner just described and remains in the hollow rivet body, thus increasing the strength of the rivet.

Blind rivetting appliances, often referred to as blind rivetting pistols, are already known, and consist essentially of a chuck and an actuating mechanism giving the chuck a reciprocating motion. Blind rivetting appliances are known which are purely pneumatically operated and others are known which are purely hydraulically operated.

Because of the large pressure surfaces required for compressed air, among other things, the pneumatic appliances are large, bulky, heavy and unhandy, so that the operator who has to hold the appliance with one hand quickly tires and is not able to reach difficult corners and angles or does so only with discomfort. Attempts have been made to help the operator in this respect by inserting an extension component between the drive actuating mechanism and the chuck, but this only makes the appliance still heavier and more expensive. Furthermore this appliance requires a special compressor which has to be moved with the appliance making its use more difficult and further increasing costs.

Similarly, the purely hydraulic appliance has the drawback that a special additional device, namely a pump and feed and discharge piping, is necessary.

Further, both known types of appliance have the drawback that for blind rivets of different dimensions sets of correspondingly differing chucks are required, so as to be able to effect an interchange. Since the chucks are precision tools, the appliance becomes still more expensive.

One object of the present invention is to produce a blind rivetting appliance which does not have the drawbacks described above, and which, while being of a smaller, lighter and more handy type of construction, exerts a high tensile stress on the rivet dowel. In particular the new appliance renders possible a novel, speedy and clean rivetting.

The blind rivetting appliance in accordance with the invention has a pneumatic system and also a hydraulic system connected with this system, in order to transmit power to the chuck. The type of construction is further such that the primary exertion of force is due to the pneumatic system so that the appliance can easily be connected to the compressed air piping which may already be available in the workshop. This type of construction of the appliance, in which the hydraulic system is interposed between the pneumatic system and the actuating device for the chuck, has the further advantage that in the tearing off of the dowel the hydraulic medium also acts additionally as a damping agent against any effects of recoil.

The invention makes it possible to give the part of the appliance containing the chuck the form of a slender tube and to arrange the two power transmission systems, the pneumatic system and the hydraulic system one behind the other. The systems can conveniently be housed in a grip component which can also be given a slender tubular form. These slender forms make it possible to have an extended shape without noticeably increasing the weight of the appliance, so that distant corners, angles and so on which are difficult to reach normally can be reached with ease.

The actual grip component is preferably arranged as much as possible at the center of gravity of the appliance, which has the advantage that relatively little stress is put on the wrist of the operator since the appliance is then practically self-balancing.

A very simple and effective form of construction of the new appliance is obtained if one working cylinder is allotted to each of the pneumatic and hydraulic power transmission systems, in which connection the working cylinder of the pneumatic medium is given a larger diameter than that of the working cylinder of the hydraulic medium and where, furthermore, the two cylinders are arranged one behind the other and have a common piston device, which preferably consists of a piston plate sliding in the pneumatic cylinder and a piston rod which engages in the hydraulic cylinder and acts on the hydraulic medium.

The actuating device for the chuck is preferably fitted with a cylinder together with a piston sliding in this cylinder and two piston rods extending in opposite directions, one piston rod being connected with the chuck and the other acting as a support member for a spring by means of which the piston is held in a rest position during pauses in operation.

The two piston rods and also the piston are further provided in accordance with an optional feature of the invention with a through bore which aligns the jaws of the chuck when the chuck is opened. The purpose, and advantage, of this is that the torn-off shank of the dowel of the blind rivet can fall out of the chuck either forwards or backwards, according to where it will disturb the operator least. This means that the through bore offers the advantage that the operator need not pay any attention to the torn-off part of the dowel but can get on with the next rivet to be rivetted, since the dowel shank of this succeeding rivet pushes out backwards the torn-off part of the dowel shank of the previously inserted rivet.

The nozzle of the appliance enclosing the chuck is preferably interchangeable, so as to be easily adaptable to blind rivets of different forms and dimensions. It is also possible to provide special nozzles for particularly inaccessible workplaces.

The housing for the various arrangements of the device may consist of a single piece. However it is easily possible, and may even be advantageous, for instance for the purpose of interchangeability, simplified feed or the like reasons, to construct the appliance from several, for example two, part housings, which can easily and quickly be joined or separated, for example by a bayonet type connection or by screwing. Such a construction with individual components of the housing also makes it possible for example, for different materials to be used for the housing, substantially corresponding to the different pressure ratios of the two power transmission systems (hydraulic and pneumatic).

The blind rivets are either inserted complete in the rivet hole of the jointed object, that is the hollow rivet body together with the insert dowel, and the nozzle of the appliance is then placed over the free end of the dowel shank, or this free end of the shank of the dowel carrying the hollow rivet body is inserted in the nozzle of the appliance and with the help of this the operator guides the complete rivet to the rivet hole of the jointed object and inserts the hollow rivet body with the part of the dowel which it encloses into the rivet hole, until the set head end of the hollow rivet body lies against the parts to be jointed. The chuck is then actuated, the dowel forcibly drawn axially through the hollow rivet body by which this body is deformed, forming the rivet joint, after which the dowel is torn through, for example at a designed fracture point, and the rivetting process is thus completed.

Further features, advantages and possibilities of application of the present invention will appear from the attached representations of embodiments of the new appliance and also from the description which follows.

In the drawing:

FIGURE 4 shows, on enlarged scale, a detail of FIG. 1.

Figure 1:
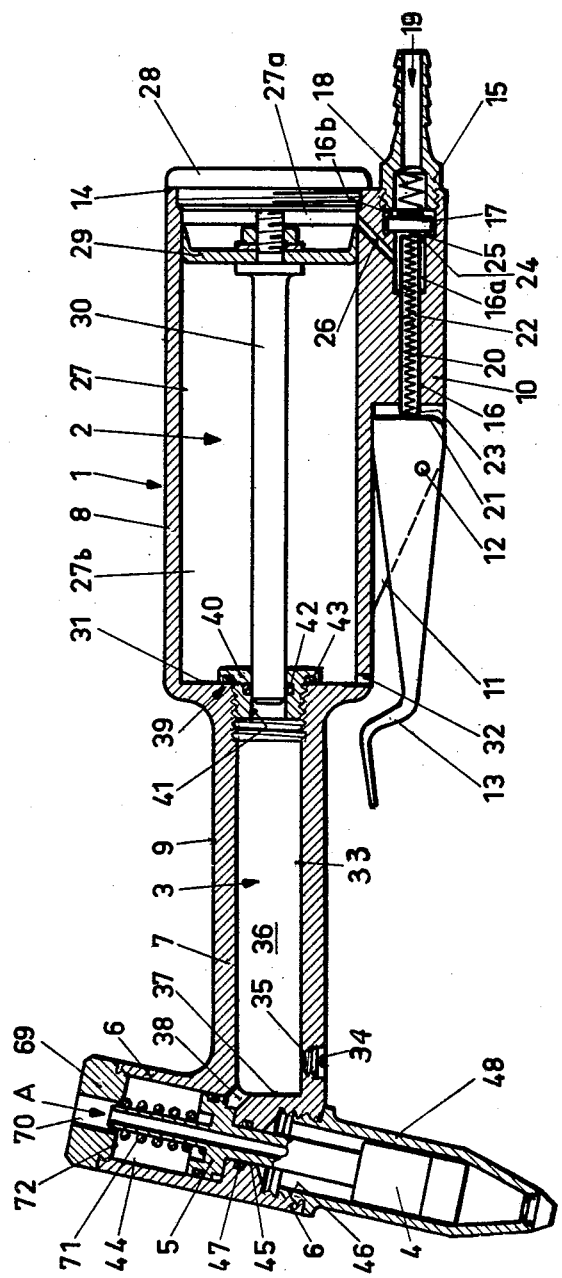
FIGURE 1 is a sectional view of a device provided in accordance with one embodiment of the invention.

As shown in FIGURE 1, the main body of the rivetting appliance consists essentially of a longitudinally extending tubular housing 1, in which are accommodated a pneumatic device 2 and a hydraulic device 3, and a housing 6, likewise tubular, applied to the front end of the hydraulic device at an angle somewhat deviating from 90°, which housing 6 accommodates a part of an actuating device 5 and carries a nozzle 48, likewise tubular, which in turn encircles a chuck 4.

The housing 1, furthermore, consists of sections 7 and 8 differing in diameter, section 7 accommodating the hydraulic device and section 8 the pneumatic device. The exterior surface 9 of the section 7, which is intended to be held in the hand, is preferably knurled. The dimensions of the appliance are such that the section 7 lies in the vicinity of the common center of gravity.

Section 8 has on its under side a projection 10, which extends forwardly in an oblique forked section 11, in the form of which the actuating trigger 13 of the appliance is rotatably supported by means of a pin 12, the projection extending rearwards to the end 14 of section 8, where a compressed air connection piece 15 is threadably engaged.

The projection 10 also has a bore 16 parallel to the axis of sections 7 and 8, which bore is relatively small at 16a (see also FIG. 4) in the vicinity of the compressed air connection and then widens out to the diameter of the connection at 16b. In the widened-out section is located a pressure valve or disc 17, which during pauses in operation shuts off, by means of the spring 18, the compressed air feed in the direction of the arrow 19, and which is furthermore connected, via a tube 20 slidingly supported in the bore 16, with the actuating trigger 13. This tube 20 abuts with its constricted end 23 against the surface 21 of the trigger 13 and contains a spring 22, one end of which abuts against the valve 17 and the other end of which is supported against the constricted end 23 of the tube 20. Thereby spring 22 presses the tube 20 against the surface 21, in such a way that a gap 25 is formed between the valve and the other end 24 of the tube. Furthermore the projection 10 has a channel 26 which connects the section 16a of the bore 16 with the pneumatic system 2.

The pneumatic system consists essentially of a cylinder 27, the rear end of which is closed by a cover 28, and a piston 29, which slides in the cylinder 27 and divides said cylinder 27 into two chambers 27a and 27b. The piston rod 30 of the piston 29 projects out of the cylinder 27 and in its forward thrust enters the hollow chamber of the section 7. The piston rod 30 has a very much smaller diameter than the piston 29. The front end 31 of the cylinder 27 is connected with the outer atmosphere via an outlet aperture 32. The piston 29 travels between the outlet aperture 32 and the channel 26.

The hydraulic system 3 consists essentially only of a cylinder 33, which is completely filled with hydraulic medium 36 through a filler bore 35 in the embodiment shown, which is tightly sealed by means of a screw plug 34. The diameter of the hydraulic cylinder 33 is considerably less than the diameter of the pneumatic cylinder 27. The front end 37 of the hydraulic cylinder 33 has a bore 38 for the feed of the hydraulic medium to the actuating device 5 of the chuck 4. A fitting piece or bushing 40 is threaded in the rear end 39 of the hydraulic cylindrical body 7, which fitting piece has a journal aperture 41 the diameter of which corresponds to the diameter of the piston rod 30 and which guides this rod slidingly. The fitting piece 40 is sealed by means of O-shaped rings 42 and 43 so that none of the hydraulic medium can enter the pneumatic cylinder chamber 27.

The cylindrical body 6, extending transversally and somewhat obliquely to the hydraulic cylinder body 7, has an axial bore running through it, which has three sections 44, 45 and 46 of differing diameters. Section 44 acts as a cylinder for the actuating device 5, section 45 as a guide for the connecting member between this actuating device and the chuck 4, with an O-shaped annular seal 47, and section 46 acts as a connecting socket for the housing 48 of the chuck 4.

The chuck 4 (see particularly FIGURE 2) consists essentially of a bushing component 49 with an end section 50 inwardly and outwardly conical, and of an intermediate piece 51. The chuck jaws 52, whose rear surfaces 53, are likewise conical, are supported in the conical end section 50. The chuck jaws, preferably only two in number, each have an axial groove 59a or 59b, whose cross-section has the shape of a sector of a circle, preferably nearly a semi-cirle, and is provided with transverse incisions to give a better grip on the shank of the rivet dowel. The intermediate piece 51 is threaded into the cylindrical section 55 of the bushing component 49 and has a bore 51a, in which a spring 56 is inserted, which in turn presses the chuck jaws 52 into their closure position via a tubular compression member 57. The end 58 of the compression member co-operating with the chuck jaws is formed with a conjugate cone to correspond with the conical surfaces 53 of the jaws. The axial passage aperture 59 formed by the grooves of the chuck jaws, and also the central bore 60 passing through the compression member 57 and the free inner space of the helical spring 56 lie in axial alignment and form a passage indicated by the double-ended arrow a. A preferably magnetic nozzle 62 with an axial bore 63 is threaded into the chuck housing 48 concentrically to the lower end 61 of the bushing component 49, the said axial bore 63 being in alignment with the above-mentioned passage a. The nozzle 62 may have a different form from that shown and, for instance, may be longer and narrower, in order to be better able to reach rivets in awkward positions.

The actuating device 5 essentially consists of a piston 64 sliding in the cylindrical section 44, the said piston being connected at either end with centrally engaging piston rods 65 and 66. The piston rods and the piston have a common longitudinal bore 67 extending completely through these parts, which bore is likewise aligned with the aforesaid passage a, and together with this forms a passage going through the chucking device and the succeeding actuating device, this passage being indicated by the letter A at the rear end of the actuating device.

The actuating device 5, the bushing member 49 and the intermediate piece 51 of the chuck 4 are rigidly connected together by means of the piston rod 65, since the rod 65, is threaded into the intermediate piece 51.

The front end surface 68 of the cylinder portion 44 acts as a counter-bearing for the piston 64 and is open to the aperture 38 through which the hydraulic medium enters the actuating device. The upper end of this cylinder is formed by a closure disc 69 provided with an axial bore 70, in which the piston rod 66 slides. This piston rod acts at the same time as a support member or bearing body for a helical spring 71 encircling it, one end of which spring abuts against the inner face 72 of the disc 69 while the other end abuts against the piston 64 and presses the latter into its rest position against the counter-bearing surface 68. The spring 71 is made sufficiently strong to bring back both the hydraulic and the pneumatic systems into their initial positions when the rivetting process ends. An O-shaped annular seal 73 is introduced at the periphery of the piston 64 and prevents any undesired escape of the hydraulic medium 36 into the cylinder 44.

Figure 2:
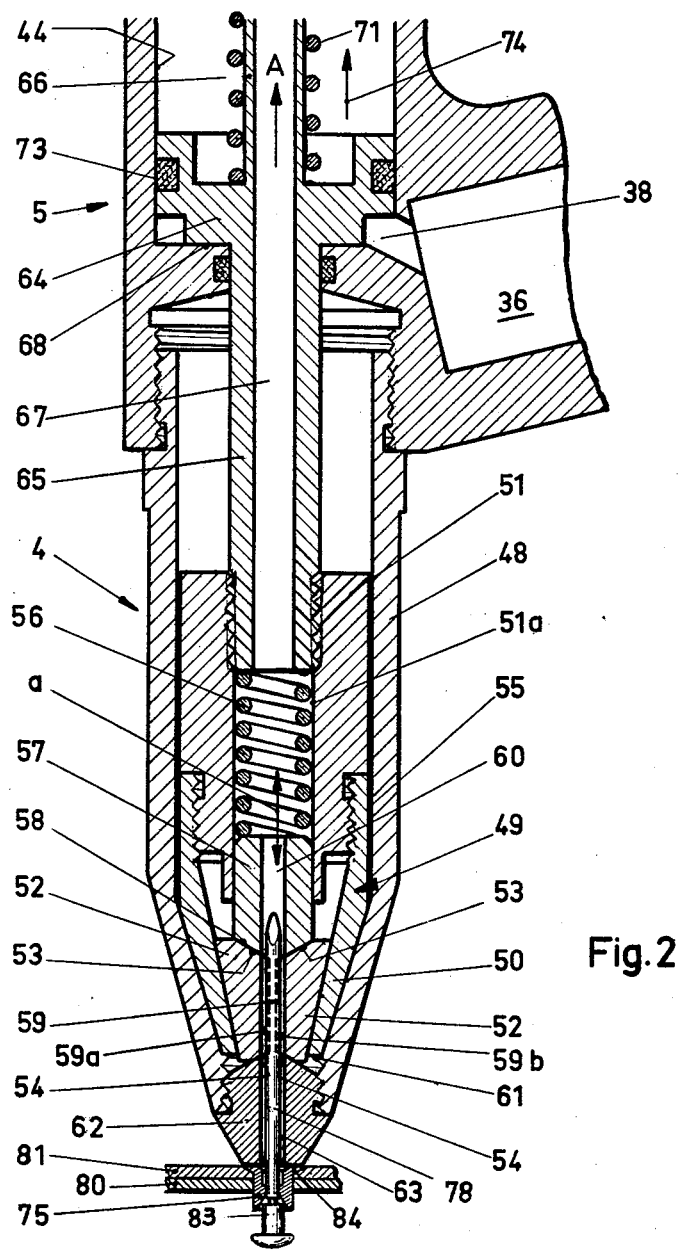
FIGURE 2 is a sectional view of a chuck, actuating device and nozzle.

The appliance as shown in FIGURES 1 and 2 operates as follows:

Before starting the appliance, the hydraulic system must be completely filled with hydraulic medium. The piston 64 of the actuating device 5 and the piston 29 of the pneumatic system 2 are in their initial or rest position (FIGURE 1).

The appliance is connected by means of the connecting piece 15 via a connecting hose (not shown) to a source of compressed air, and the appropriate valve or the like opened, so that compressed air is available in the connecting member 15.

The free shank 78 of the dowel 76 of the blind rivet (see FIGURES 3a to 3d) is inserted through the bore 63 of the nozzle 62 into the aperture formed by the chuck jaws 52 and their grooves 59a, 59b, and through into the bore 60 of the pressure member 57. The end of the dowel 76 projecting out of the appliance is enclosed by the hollow rivet body 75. The insertion described above of the shank 78 of the dowel 76 into the appliance can either follow now, before the hollow rivet body and the dowel are inserted in the rivet hole of the parts to be joined, in which case the insertion into this hole is effected by means of the appliance which here acts as a holder and guide; or the hollow rivet body together with the dowel which it encloses are inserted in the rivet hole and then the appliance is applied by means of the aperture consisting of the nozzle bore 63, chucking jaws channel 59 and pressure member bore 60. The application is restricted on each occasion by the set-head 84 at the rear end of the hollow rivet body 75, the set-head 84 forming a stop, restricting movement during the insertion of the hollow rivet body in the rivet hole of the parts to be jointed. The set-head is applied on the same side of the parts as that on which the rivetting takes place.

As soon as the blind rivet is completely inserted in the rivet hole and the freely projecting portion of the shank of the dowel has been gripped by the rivetting appliance, the rivetting process can begin. The trigger 13 is moved towards said section, for instance by means of two fingers of the operator's hand encircling the body section 7 and this causes the tube 20 to be moved towards the valve 17 until it lies against and opens said valve against the action of the compression spring or helical spring 18. Compressed air passes through the channel 26 into the chamber 27a of the pneumatic system and presses the piston 29 forward. The piston rod 30 is simultaneously pressed into the cylinder 33 of the hydraulic system, forcing out the hydraulic medium 36 through the aperture 38. The medium 36, which may be oil or the like, thus constrained acts on the piston 64 of the actuating device 5, so that the piston is displaced in the direction of the arrow 74 (FIGURE 2). At the same time the bushing 49 and the intermediate piece 51 are moved in the same direction, that is to say rearwards away from the nozzle 62. As the chucking jaws oppose this movement, there occurs next a relative movement between the opposed and adjacent surfaces of the chucking jaws 52 and the conical section 50 of the bushing 49, since the helical spring 56 tends to hold the chucking jaws 52 in position against the above-mentioned conical back surface of the nozzle 62. Because of this relative movement the chucking jaws are moved towards one another, that is to say the aperture 59 which they enclose is narrowed, and the dowel shank 78 is firmly gripped. The chucking jaws are compelled to move from the conical section 50 of the bushing in the direction away from the nozzle 62, whereby the dowel shank is still more firmly gripped by the chucking jaws and likewise moved in the same direction (arrow 74, FIGURE 2), until the dowel shank finally tears off at its designed fracture point. The axial tensile stress occurring is compensated by the application of the nozzle 62 to the set-head 84 of the hollow rivet body 75. The tearing-off of the dowel shank is felt by the operator as a light recoil, on which he releases the actuating lever 13. All the parts concerned are then brought by the spring 74 back into their initial positions. A further advantage is found when operating in the manner described with the appliance in that no compression of the air takes place in the chamber 27b by the piston rod, as the air can escape through the aperture 32; nor does any compression take place during the return movement of the piston, as an escape path is formed for the air through the channel 26, the widened-out bore section 16a, the gap 25 and the tube 20.

FIGURES 3a to 3d show diagrammatically various stages of the rivetting process. As already mentioned, the blind rivet consists of the hollow rivet body 75 and a much longer dowel 76 with a head 77 and shank 78. The complete blind rivet, consisting of hollow rivet body and dowel, is inserted through the common rivet hole 79, a bore-hole for instance. The bore is located in the parts 80 and 81 which may, for example, be two metal sheets. The blind rivet is inserted from one side, in the drawing the lower side. As has been expressly stated already, the appliance according to the invention can also be used for insertion.

Figure 3A:
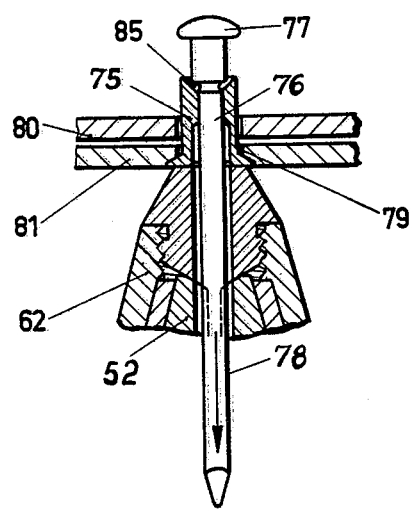
FIGURES 3a to 3d show the rivetting process diagrammatically.
Figure 3B:
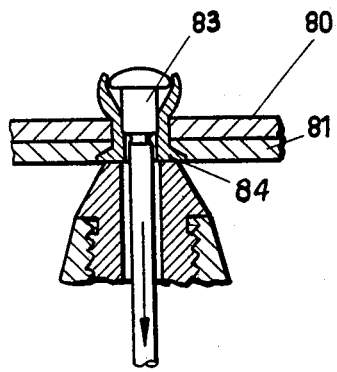
Figure 3C:
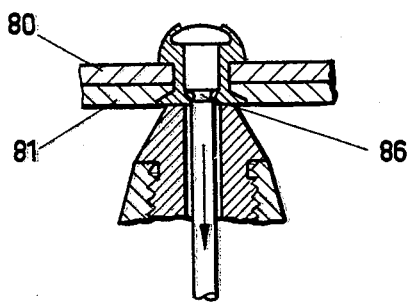
Figure 3D:
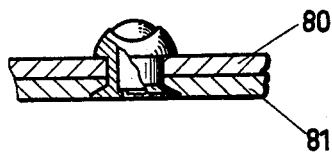

As soon as the tension indicated by the arrow in FIGURES 3a to 3d is exerted on the dowel shank 78 by the appliance, this shank, together with the full section 83 next to it and the head 77, are drawn back axially, the axial tensile stress, as already mentioned, being compensated by the application of the nozzle 62 against the set-head 84 of the blind rivet body 75. By the drawing-in of the full section 83 and the head 77 into the funnel-shaped socket 85 at the shank end on the closer head side of the hollow rivet body 75, the latter is deformed as shown in FIGURES 3b and 3c, whereby at the same time the components 80 and 81 are pressed together and joined. In this connection the hollow rivet is deformed in such a way that first of all the shank of the hollow rivet body projecting on the closer side of the components, that is to say in this case on the free side of the component 80, is widened out into a calyx shape while at the same time a radial constraint is exerted directly against the relevant surface of the jointed body component 80. The constraint of the hollow rivet material, which in this zone is of increased diameter, is essentially exerted through the full section 83 and the head 77 of the dowel. As the axial withdrawal proceeds (FIGURE 3c), the material of the hollow rivet body 77 is also pressed against the inner wall of the common rivet hole, for example the bore 79 in the components 80 and 81. The shank end of the hollow rivet body 75 projecting on the closer head side is drawn over in known manner in a tulip shape over the head 75 of the dowel and encircles the said head.

After these deformations have been effected, the dowel shank is torn off at a point 86 designed for this purpose and where the cross-section is narrowed, a further axial tensile stress being exerted on the dowel shank 78 by means of the chucking jaws 52 of the pistol type blind rivetting appliance. The torn-off portion of the shank is ejected from the pistol backwards by the force applied thereto or by free fall. The blind rivet now has the shape shown in FIGURE 3d. The portion of the dowel remaining in the hollow rivet body forms a filling and stiffening element, which is protected both by the tulip-shaped closer head and also by radial application against the bore of the hollow rivet body 75 and through this against the bore 79 of the components 80 and 81, against any possible loosening and falling out. The shear and tensile strengths of this rivet joint are very high, so that this type of blind rivet is particularly suitable for highly stressed structures.

Of course the blind rivetting appliance in accordance with the invention can be varied or modified in many ways without going outside the scope of the invention.

I claim:

1. A rivetting device comprising means defining operatively coupled pneumatic and hydraulic chambers, said hydraulic chamber having a hydraulic medium therein, piston means extending between said chambers and displaceable in the same, control means for controllably admitting a pneumatic medium into and terminating the supply of said pneumatic medium to said pneumatic chamber, said piston means being displaced by said pneumatic medium from a first to a second position to exert a force on said hydraulic medium, said pneumatic chamber being provided adjacent said second position with an outlet opening which vents the pneumatic chamber to the ambient atmosphere, rivet engaging means, and actuating means coupled to said hydraulic chamber and to said engaging means for operating the latter; said actuating means defining a chamber and including a piston dividing the latter said chamber into first and second sections, one of said sections being coupled to said hydraulic chamber to receive hydraulic medium therefrom whereby said piston can be displaced by said hydraulic medium, and a spring in the other of said sections and opposing movement of said piston by the hydraulic medium, said piston being coupled to and operating the rivet engaging means, said spring being of a strength to be effective through said piston, upon termination of the supply of pneumatic medium to said pneumatic chamber, to force hydraulic medium from said one section into said hydraulic chamber to restore said piston means to said first position.

2. A device as claimed in claim 1 wherein said spring is a helical spring.

3. A device as claimed in claim 1 comprising a piston rod on said piston, said rod and piston defining an ejector channel, said rod including a part in said other section, said spring encircling said rod.

4. A device as claimed in claim 1 wherein said piston means comprises a piston in said pneumatic chamber and a rod connected to the latter said piston and extending into said hydraulic chamber, said device further comprising a fluid tight seal between the chambers and including a bushing slidingly accommodating said rod.

5. A device as claimed in claim 1 wherein said control means comprises a spring loaded inlet and blowoff valve.

6. A device as claimed in claim 1 wherein said control means defines coaxial bores of different diameters, a disc in the larger of said bores, a spring in the larger of said bores and urging the disc toward the smaller of the bores to seal the same, means to supply a pneumatic medium to the larger bore, a trigger, a hollow tube in the smaller bore and engaged by the trigger, a spring in said hollow tube and engaged against said disc for urging the hollow tube against said trigger, the smaller bore being coupled to said pneumatic chamber, the spring in the larger bore being stronger than the spring in the smaller bore whereby said bores are isolated by said disc, said trigger being effective through said hollow tube to displace said disc against the force of the spring in the larger bore.

References Cited in the file of this patent
UNITED STATES PATENTS

| | | |
|---|---|---|
| 2,403,262 | Colley | July 2, 1946 |
| 2,526,956 | Kugler | Oct. 24, 1950 |
| 2,652,942 | Muchy | Sept. 22, 1953 |
| 2,820,566 | Van Hecke | Jan. 21, 1958 |